United States Patent [19]
Tate et al.

[11] 3,956,214
[45] May 11, 1976

[54] METHOD OF PREPARING CURABLE PELLETS OF POLYETHYLENE WITH A MOTIONLESS MIXER

[75] Inventors: Stanley L. Tate; Bobby A. Rowland, both of Carroll County, Ga.; Michael M. Blackstone, Duval County, Fla.

[73] Assignee: Southwire Company, Carrollton, Ga.

[22] Filed: Nov. 5, 1974

[21] Appl. No.: 521,113

[52] U.S. Cl. .............................. 260/23 H; 260/34.2; 260/42.42; 260/42.46; 526/22; 526/352
[51] Int. Cl.² ............................................ C08J 3/20
[58] Field of Search ............. 260/34.2, 42.42, 42.46, 260/94.9 GA, 23 H

[56] References Cited
UNITED STATES PATENTS 3,578,647  5/1971  Gregorian et al. .......... 260/94.9 GA
3,639,529  2/1972  MacKenzie et al. ........ 260/94.9 GA

FOREIGN PATENTS OR APPLICATIONS 899,796  6/1962  United Kingdom

OTHER PUBLICATIONS

Plastics Technology–Oct. 1974, pp. 37–43.

Primary Examiner—V. P. Hoke
Attorney, Agent, or Firm—Van C. Wilks; Herbert M. Hanegan; Stanley L. Tate

[57] ABSTRACT

The present invention relates to a method for preparing curable pellets of polyethylene and copolymers thereof by mixing polyethylene pellets with a liquid curing agent at a temperature below the softening point of polyethylene and copolymers thereof.

8 Claims, 3 Drawing Figures

METHOD OF PREPARING CURABLE PELLETS OF POLYETHYLENE WITH A MOTIONLESS MIXER

BACKGROUND OF THE INVENTION

The present invention relates to the preparation of curable pellets of polyethylene or copolymers of polyethylene.

In order to produce extruded articles from curable pellets of polyethylene or its copolymers a crosslinking agent of curing agent must be uniformly dispersed throughout the polymer. Heretofore, curable pellets of polyethylene and copolymers of polyethylene have been prepared by methods: (1) in which polyethylene or copolymers thereof and a curing agent are mixed on a two-roll mill and the resulting band pelletized using a pellitizer; (2) in which the polyethylene or its copolymers and a curing agent are first premixed in a mixer such as a ribbon blender or vortex mixer, then fused and mixed in a twin-screw continuous mixer and subsequently pelletized; (3) in which polyethylene or copolymers thereof and a curing agent are mixed using a Banbury mixer and thereafter calendered using a two-roll mill and thereafter the mixture is pelletized; or (4) in which the polyethylene or copolymers thereof and inert fillers and other additives are fused and mixed in a twin-screw continuous mixer or Banbury mixer and the mixture is thereafter pelletized and the curing agent is subsequently added at a later time in a high intensity mixer by stirring curing agent and pellets at a high speed until the curing agent is evenly dispersed on the pellets and absorbed therein.

The above methods have shortcomings in that the pellets produced are likely to become contaminated during the milling and mixing state thereby causing the extruded articles produced therefrom to have impaired dielectric properties. Moreover, the cost of the equipment used is high and the production rates are low.

SUMMARY OF THE INVENTION

It is, therefore, a principle object of the present invention to provide a method for overcoming the aforementioned disadvantages of the prior art techniques by providing an economical contaminant free method for producing curable pellets of polyethylene and copolymers of polyethylene for insulating wire and cable.

It is another object of the present invention to provide a continuous method of uniformly dispersing a suitable curing agent throughout a matrix of polyethylene and copolymers thereof, without heating the polyethylene matrix above the softening point thereof.

Still another object of the present invention is to provide a method for continuous addition of a curing agent to a matrix which consists of pellets of polyethylene and copolymers thereof without heating the mixture to a temperature equal to or above the decomposition temperature of the curing agent.

These and other objects of the present invention are accomplished by providing a method for continuously producing curable pellets of polyethylene and copolymers thereof whereby a composition comprising polyethylene or the copolymers thereof and a filler selected from the group consisting of silica, carbon black, alumina and calcium silicate are mixed with an organic peroxide by first fusing the polyethylene or copolymers thereof with a filler or combination of fillers selected from the group outlined above in a plasticating means until filler is evenly dispersed throughout the polymer matrix where upon the polymer-filler mixture is processed into pellets. The pellets so produced are then dried and are contacted with a stochiometric amount of curing agent in a heated static mixer at a temperature below the softening point of the polymer and at a temperature below the decomposition temperature of the curing agent. The treated pellets are thereafter cooled in a second static mixer before being conveyed to storage or to an extrusion line for fabrication into a final product.

A principle advantage of the present invention over prior art techniques is the cost savings which accrue from the use of the technique disclosed herein. These cost savings are primarily derived from decreased operating costs of plasticating equipment. As will be appreciated, the present invention eliminates the need for operating plasticating equipment at temperatures below the thermal decomposition temperature of the curing agent thereby increasing the output of pellets from the plasticating equipment by a factor of two to three. It will also be appreciated that by producing curable polyethylene pellets in which the curing agent has not been exposed to temperatures above the thermal decomposition temperature thereof both the extrusion rate and the quality of products extruded therefrom are enhanced.

A further advantage of the present invention over prior art techniques is the improved dispersion of the curing agent throughout the pellet matrix which cannot be achieved within the temperature limitations of the present invention when conventional mixing techniques are employed.

Having in mind the above and other objects that will be evident from a reading of this disclosure, the present invention comprises the combinations and arrangements of parts illustrated in the presently preferred embodiment of the present invention which is hereinafter set forth in sufficient detail to enable those persons of ordinary skill in the art to clearly understand the function, operation, construction and advantages of it when read in conjunction with the accompanying drawings.

BRIEF DESCRIPTION OF THE DRAWINGS

Broadly stated, FIG. 1 illustrates in diagrammatic form a motionless mixer used to practice one embodiment of the present invention. As shown in FIG. 1, the apparatus consists of motionless mixer 10 which is divided into three zones; heating zone 11, mixing zone 12, and cooling zone 13. Also included in the apparatus is entry orifice 14, heating means 15, heating means connectors 16, air bleed off valve 19, curing agent supply line 20, helical elements 21, curing agent injectors 22, cooling means 23, cooling means connector 30 and exit orifice 28.

Figure 1:
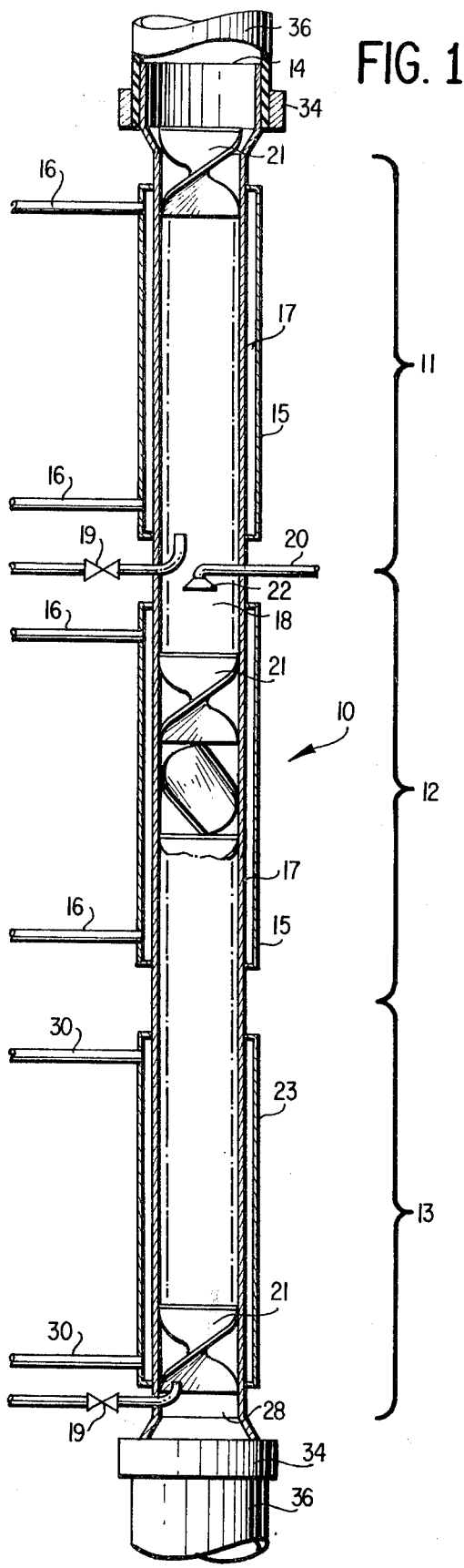
FIG. 1 is a cross-sectional view taken along the longitudinal axis of a mixer of the type used to practice the present invention.

The present invention is described in terms of a single motionless mixer mounted in combination with a pneumatic system for conveying polyethylene pellets from a conventional pelletizing apparatus to either storage tanks or extruders. The motionless mixer 10 is positioned in pneumatic line 26 by means of mounting couplings 34. After motionless mixer 10 is connected to pneumatic line 36, polyethylene pellets are blown into mixer 10 from line 36 through entry orifice 14 and into heating zone 11. As the pellets traverse heating zone 11, heat is supplied by heating means 15, which raises the temperature of the pellets to a point slightly below the softening point of polyethylene. The pellets traverse the heating zone through channels between the interior wall 17 of mixer 10 and the off-set helical elements 21 rigidly mounted therein. Collision by the pellets with the warm helical elements 21 in the heating zone raises the temperature of surfaces to from about 60°C to about 80°C at which temperature the pellet surfaces become momentarily liquid at the point of collision. As the pellets pass mixing zone entry point 18, liquid curing agent is sprayed upon the pellets and off-set helical elements 21 from curing agent injectors 22. As the pellets continue to flow through mixer 10 the pellets and curing agent divide at the leading edge of each off-set helical element 21 and follow the two channels created by the element 21 and the interior wall 17 of mixer 10. At each succeeding element 21 the two channels are further divided resulting in an exponential increase in stratification. The number of striations produced is $2^n$ where $n$ is the number of elements. Rotational circulation of the pellets around their hydraulic center in each channel of the mixer causes radial mixing of the polyethylene pellets and the liquid curing agent whereby all pellets and curing agent are continuously and completely intermixed. As the pellets traverse mixing zone 12 and are being intermixed with the liquid curing agent, heat is being applied to them by conduction from heating means 15 through the walls 17 of mixer 10 and from helical elements 21 thereby causing instantaneous liquefication of the pellet surfaces of collision with elements 21 and walls 17 and consequential defusion of the liquid curing agent into the polyethylene pellets.

It is believed that the pellets do not adhere to each other to form lumps during mixing because the surface only of each pellet is soft only momentarily at those portions of the surface where the pellets suffer friction and collisions, and that the inner portion of the pellets remain at a temperature well below the softening points of both polyethylene homopolymer and copolymer resins. As a result of the mixing and application of heat the curing agent penetrates and diffuses into the pellets through the softened surface layer. It is believed that the liquid cross-linking agent penetrates and defuses into the pellets through the softened areas on the pellet surfaces by liquid-liquid diffusion. Since the rate of diffusion of a liquid in another liquid, excluding combination of completely incompatible liquids, is generally higher than that of a liquid into a solid or a solid into a solid, liquid curing agents penetrate and diffuse into the pellets at a higher rate when the surfaces of the pellets are softened than when the pellet surfaces are in a non-softened state.

For example, curable pellets of the polyethylene wire insulation formulations shown in Table I were prepared by adding the indicated amounts of $\alpha, \alpha'$-bis(t-butyl-peroxy)-diisopropyl benzene using the method and apparatus herein. The antioxidant referred to in Table I is polymerized-1,2-dihydro-2,2,4-trimethyl quinoline.

TABLE I

| INGREDIENT | COMPOUND A,% | COMPOUND B,% | COMPOUND C,% |
| --- | --- | --- | --- |
| Polyethylene | 69.820 | 83.264 | 65.42 |
| Antioxidant | 0.345 | 0.416 | 0.16 |
| Carbon black | 27.970 | 14.156 | 0.33 |
| Chlorinated Polyethylene | | | 8.51 |
| Antimony trioxide | | | 5.23 |
| Clay | | | 18.45 |
| Lead Oxide | | | 0.26 |
| Peroxide | 1.520 | 1.748 | 1.64 |

As would be obvious to one skilled in the art, the higher the working temperature, the shorter the requisite mixing time. However, when the requisite mixing time is shortened by raising the working temperature, the working temperature must not be so high that the curing agent penetrates and diffuses into the pellets before it is uniformly dispersed throughout the pellets which can cause lack of uniformity in the concentration of curing agent penetrating into individual pellets. Further, if the working temperature is set too near the softening point of polyethylene the pellets tend to cohere into lumps before or during agitation.

After passing mixing zone exit point 26, the pellets enter the cooling zone 13 of mixer 10. Cooling means 23 reduces the temperature of the pellets from slightly below the softening point of polyethylene to from about 15°C to about 25°C as the pellets traverse the helical elements 21 of cooling zone 13. At exit orifice 28 curable pellets of polyethylene leave mixer 10 and re-enter pneumatic line 36 to be conveyed to storage tanks or extruders (not shown) for final processing into an extruded article. In one preferred embodiment of the present invention, cooling means 30 is a water jacket with chilled water recirculating there through from cooling means connectors 30. Valves 19 are provided so that hot and cold air may be bled from the system during operation thereby allowing an operator to make pressure changes dictated by product quality or other empirical data.

Figure 2:
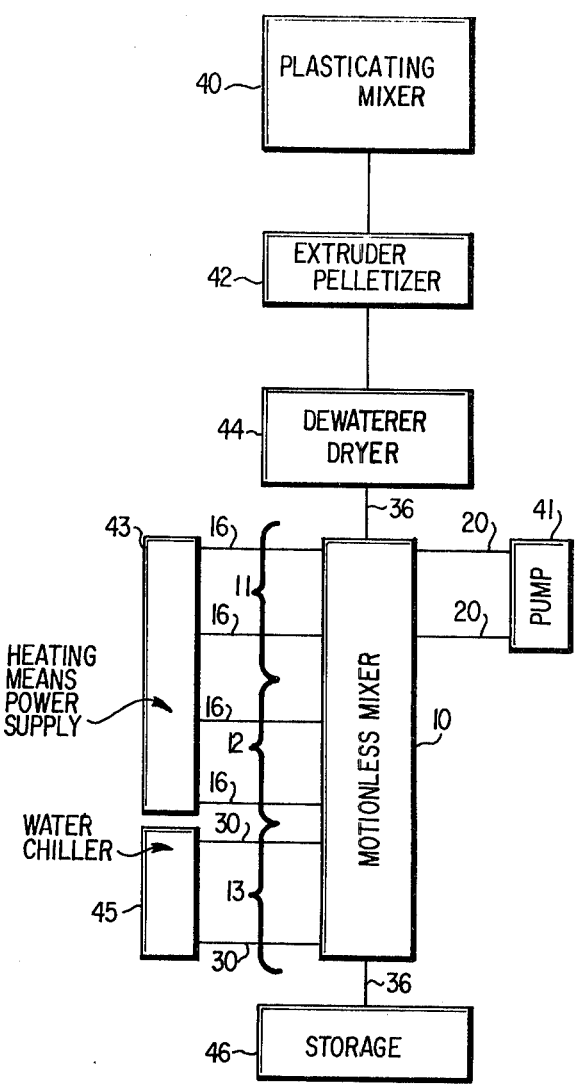
FIG. 2 is a schematic representation of one equipment configuration for a plastic processing facility designed to practice the present invention.

Referring now to FIG. 2 which is a schematic representation of one embodiment of the present invention. Polyethylene, copolymers of polyethylene, filler and antioxidant are combined in a twin screw plasticating mixer 40 which feeds an extruder-pellitizer 42 in which the plasticated mixture of polymer, filler and antioxidant is pelletized. The pellets from extruder-pelletizer 42 are then transferred to dewaterer-dryer 44 where water is removed from the pellets and the pellets are dried before entering pneumatic line 36. The pellets flow through pneumatic line 36 into motionless mixer 10 where curing agent is added to the pelletized mixture of polymer, filler and antioxidant. Cureable pellets emerging from motionless mixer 10 are then transferred through pneumatic line 36 to storage tank 46. The mixing zone 12 and heating zone 11 of motionless mixer 10 are connected to heating means power supply 43 by heating means connectors 16 to supply energy to heat the pellets as they pass through motionless mixer 10. Chilled water is supplied to cooling the zone 13 of motionless mixer 10 by water chiller 45 which is connected to motionless mixer 10 by cooling mixer connectors 30. Liquid curing agent is metered into motionless mixer 10 from curing agent metering pump 41 which is connected to mixer 10 by curing agent supply lines 20.

Figure 3:
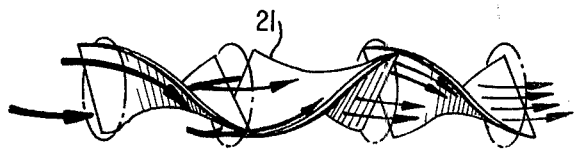
FIG. 3 is a detail representation of the passage of polyethylene pellets across the elements of a motionless mixer of the type used in the present invention.

Referring now in more detail to FIG. 3 wherein heavy dark arrows indicate the direction of flow of the pellets along the off-set helical elements 21 of a motionless mixer. The pellets and curing agent divide at the leading edge of each off-set helical element 21 and follow two channels created by the element 21 and the interior wall of the mixer. At each succeeding element 21 the two channels are further divided resulting in an exponential increase in stratification. The number of striations produced is $2^n$ where n is the number of elements.

Although only one preferred embodiment of the present invention has been illustrated herein, it is to be understood that obvious modifications and changes may be made without departing from the spirit and scope of the invention as defined in the appended claims and the invention is intended to include all such modifications and changes which fall within the scope of the claimed invention.

What is claimed:

1. A method of preparing curable pellets of polyethylene and copolymers of polyethylene comprising the steps of:
    a. fusing polymers such as polyethylene and copolymers thereof with fillers, lubricants and antioxidants in a plasticating means until said fillers, lubricants and antioxidants are evenly dispersed throughout the polymers;
    b. processing the final polymer, filler, lubricant, antioxidant mixture into the pellets;
    c. contacting and mixing said pellets with a stoichiometric amount of a curing agent in a heated motionless mixer at a temperature below the softening point of the polymers and at a temperature below the decomposition temperature of said curing agent whereby said curing agent is absorbed into said pellets; and
    d. cooling said polymer curing agent mixture to ambient temperature before storage.

2. The method of claim 1 wherein said fillers are selected from the group consisting of silica, carbon black, alumina, calcium silicate and mixtures thereof.

3. The method of claim 1 further including heating said motionless mixer and said pellets to a temperature of from about 60°C to about 80°C and spraying said pellets with from about 0.01 to about 10.0 percent by weight of a liquid organic peroxide selected from a group consisting of dicumyl peroxide and $\alpha,\alpha'$-bis(t-butylperoxy)-diisopropyl benzene under conditions of laminar and radial mixing and thereafter cooling said motionless mixer and pellets to a temperature of from about 15°C to about 25°C.

4. The method of claim 1 wherein said pellets consist essentially of about 69.82 percent polyethylene, about 1.52 percent $\alpha,\alpha'$-bis(t-butylperoxy)-diisopropyl benzene, about 0.345 percent polymerized-1,2-dihydro-2,2,4-trimethylquinoline, about 27.970 percent carbon black and about 0.345 percent zinc stearate.

5. The method of claim 1 wherein said pellets consist essentially of about 83.264 percent polyethylene, about 1.748 percent $\alpha,60$ '-bis(t-butylperoxy)-diisopropyl benzene, about 0.416 percent 1,2-dihydro-2,2,4-trimethylquinoline, about 14.156 percent carbon black and about 0.416 percent zinc stearate.

6. The method of claim 1 wherein said pellets consist essentially of about 65.42 percent polyethylene, about 8.51 percent chlorinated polyethylene, about 5.23 percent antimony trioxide, about 18.45 percent clay, about 0.16 percent polymerized-1,2-dihydro-2,2,4-trimethyl quinoline, about 0.26 lead oxide, about 0.33 percent zinc stearate and about 1.64 percent $\alpha,\alpha'$-bis(t-butylperoxy)-diisopropyl benzene.

7. A method of preparing curable pellets of polyethylene and copolymers of polyethylene comprising forcing a mixture of said pellets and a liquid curing agent through a motionless mixer and heating said motionless mixer and said mixture to a temperature of from about 40°C to about 80°C to locally soften the surfaces of said pellets without causing cohesion between said pellets thereby diffusing said liquid curing agent into said pellets.

8. A method of preparing curable pellets of polyethylene and copolymers of polyethylene comprising the steps of:
    a. fusing polymers such as polyethylene and copolymers thereof with fillers, lubricants and antioxidants in a plasticating means until said fillers, lubricants and antioxidants are evenly dispersed throughout the polymers;
    b. processing the polymer, filler, lubricant, antioxidant mixture into pellets;
    c. contacting and mixing said pellets with a stoichiometric amount of a liquid curing agent in a heated motionless mixer, said mixer and pellets being heated to a temperature of from about 40°C to about 80°C whereby the surfaces of said pellets are locally softened without causing cohesion between said pellets and thereby defusing said liquid curing agent into said pellets; and
    d. cooling said pellets impregnated with curing agent to ambient temperature before storage.

* * * * *